US012519898B2

(12) United States Patent
Tanaka

(10) Patent No.: US 12,519,898 B2
(45) Date of Patent: Jan. 6, 2026

(54) IMAGE PROCESSING APPARATUS AND IMAGE PROCESSING METHOD

(71) Applicant: SHARP KABUSHIKI KAISHA, Sakai (JP)

(72) Inventor: Kenji Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/235,556

(22) Filed: Aug. 18, 2023

(65) Prior Publication Data

US 2023/0412752 A1    Dec. 21, 2023

Related U.S. Application Data

(63) Continuation of application No. 17/846,763, filed on Jun. 22, 2022, now Pat. No. 11,785,167.

(30) Foreign Application Priority Data

Jun. 28, 2021  (JP) .................. 2021-106873

(51) Int. Cl.
  *G06K 15/00*  (2006.01)
  *H04N 1/00*  (2006.01)
  *H04N 1/44*  (2006.01)
(52) U.S. Cl.
  CPC ....... *H04N 1/4426* (2013.01); *H04N 1/00244* (2013.01); *H04N 1/442* (2013.01); (Continued)
(58) Field of Classification Search
  CPC .. H04N 1/4426; H04N 1/00244; H04N 1/442; H04N 2201/006; H04N 2201/0094
  (Continued)

(56) References Cited

U.S. PATENT DOCUMENTS

2007/0019232 A1* 1/2007 Kano ................. H04N 1/00968
  358/1.15
2009/0075683 A1* 3/2009 Backholm ............... H04L 51/58
  455/466

(Continued)

FOREIGN PATENT DOCUMENTS

JP  2016157428 A  9/2016
JP  2017041090 A  2/2017

(Continued)

OTHER PUBLICATIONS

IP.com (Year: 2024).*

(Continued)

*Primary Examiner* — Moustapha Diaby
(74) *Attorney, Agent, or Firm* — ScienBiziP, P.C.

(57) ABSTRACT

An image processing apparatus includes: an apparatus information generator, an authenticator, and a job controller. The apparatus information generator generates apparatus information including apparatus identification information. The authenticator performs non-contact user authentication with a communication terminal by using communication without the Internet or by capturing image information. The job controller causes the communication terminal whose user has been authenticated by the authenticator to acquire the apparatus information by using communication without the Internet or by providing the apparatus information as image information. The job controller causes an apparatus corresponding to the apparatus information to execute a job on a basis of the apparatus information transmitted from the communication terminal via the Internet and setting information related to job execution.

7 Claims, 12 Drawing Sheets

(52) U.S. Cl.
CPC ............... *H04N 2201/006* (2013.01); *H04N 2201/0094* (2013.01)

(58) Field of Classification Search
USPC ....................................................... 358/1.14
See application file for complete search history.

(56) References Cited

U.S. PATENT DOCUMENTS

| | | | | |
|---|---|---|---|---|
| 2011/0083105 | A1* | 4/2011 | Shin | G06F 40/166 |
| | | | | 715/830 |
| 2014/0331164 | A1* | 11/2014 | Enomoto | H04N 1/00307 |
| | | | | 715/771 |
| 2014/0359737 | A1* | 12/2014 | Ishizu | H04L 63/107 |
| | | | | 726/7 |
| 2017/0127278 | A1* | 5/2017 | Yamamoto | H04M 1/724631 |
| 2017/0155773 | A1 | 6/2017 | Sato et al. | |
| 2017/0171414 | A1* | 6/2017 | Naito | H04N 1/00307 |
| 2018/0015755 | A1* | 1/2018 | Yamada | G06F 3/1292 |
| 2019/0332334 | A1* | 10/2019 | Yoshihara | G06F 3/1231 |
| 2021/0303228 | A1* | 9/2021 | Shibata | G06F 3/1287 |
| 2022/0303428 | A1* | 9/2022 | Kubota | H04N 1/4413 |

FOREIGN PATENT DOCUMENTS

| | | |
|---|---|---|
| JP | 2017097762 A | 6/2017 |
| JP | 2019159971 A | 9/2019 |
| JP | 2019213045 A | 12/2019 |

OTHER PUBLICATIONS

ProQuest (Year: 2024).*
ProQuest search History (Year: 2025).*
IP.com search history (Year: 2025).*

* cited by examiner

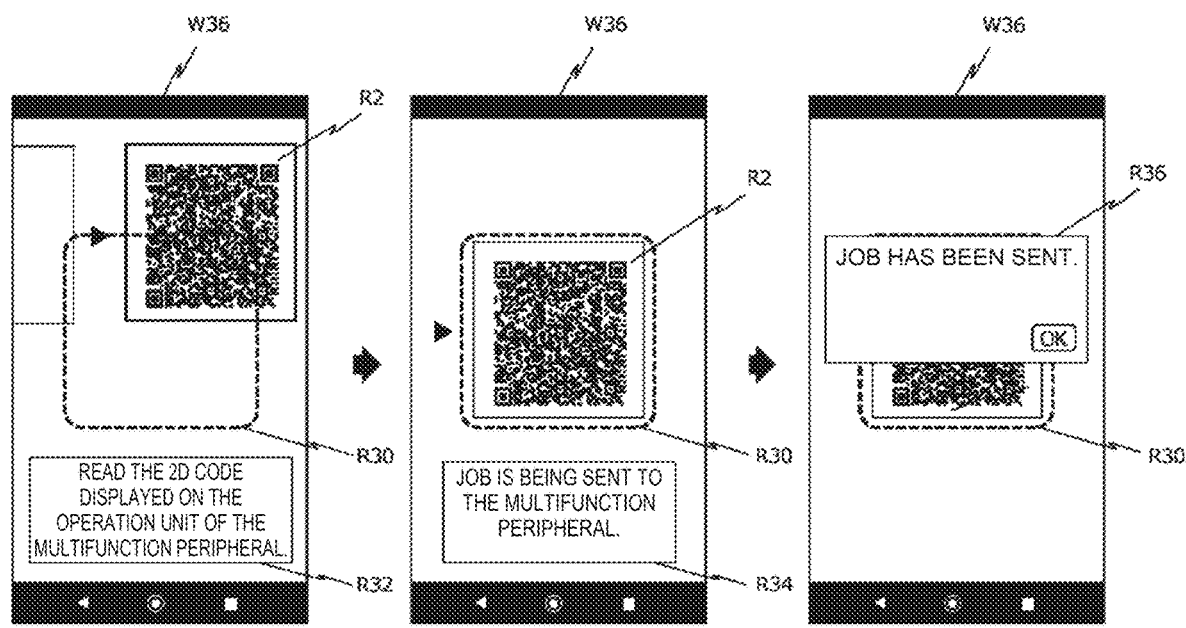

IMAGE PROCESSING APPARATUS AND IMAGE PROCESSING METHOD

CROSS-REFERENCE TO RELATED APPLICATION

The present application is a continuation application of U.S. patent application Ser. No. 17/846,763, filed on Jun. 22, 2022, which claims priority from Japanese Patent Application Number 2021-106873, filed on Jun. 28, 2021, the content to which is hereby incorporated by reference into this application.

BACKGROUND OF THE INVENTION

1. Field of the Invention

One aspect of the present disclosure relates to an image processing apparatus and an image processing method capable of performing a non-contact operation by receiving an instruction related to job setting via communication and capable of authenticating a user who performs the operation.

2. Description of the Related Art

There has long been a desire to be able to preconfigure an image processing apparatus at a remote location. It is already known that an external mobile communication terminal connected to an image processing apparatus by communication accepts operations for the apparatus and notifies information related to the state and operation of the image processing apparatus.
There is a growing demand for non-contact operation of image processing apparatuses such as multifunction peripherals, scanners, or printers that are operated by an unspecified or large number of people, for reasons such as controlling the risk of infection by new coronavirus and the like. For example, since mobile communication terminals such as smart phones and tablet terminals have become widespread, and everyone has a mobile communication terminal in offices where an image processing apparatus is installed, it is technically possible to operate the image processing apparatus in a non-contact manner using a mobile communication terminal. Image processing apparatuses installed in offices are often connected to private networks such as company intranets, which are isolated from the Internet from the perspective of ensuring the security of the data they handle.

On the other hand, mobile communication terminals are often used for applications that require an Internet environment, such as social networking services (SNS) and e-mail. In such a network environment, it is complicated for each employee to switch the network setting of a smartphone or other device from an Internet connection to an intranet connection each time he or she wants to operate a multifunction peripheral installed in the office without any contact. Further, the impact on applications and smartphone functions other than non-contact operation is significant, such as the need to switch proxy settings, or the like as well. There is a strong demand for non-contact operation of image processing apparatuses such as multifunction peripherals installed in offices without changing the network settings connected to the Internet.

For example, the following techniques is known to notify a user that a document remains in an image forming apparatus. The user holds the mobile terminal over the MFP to start using the MFP. The NFC communicator of the MFP reads the user's e-mail address stored in the mobile terminal and the Bluetooth (registered trademark) pairing code and periodically checks the Bluetooth connection state. When the user with the mobile terminal walks away from the MFP, moves out of the Bluetooth communication range, and disconnects, the controller of the MFP detects a document, and if the document remains, transmits a message to the e-mail address read by the NFC communicator to prompt the collection of the document (see, for example, Japanese Unexamined Patent Application No. 2018-121098).

Furthermore, the following technique is known to solve the issue of an image forming apparatus being used by other users. This relates to a system that allows various functions to be implemented on an image forming apparatus from a mobile information terminal after the mobile information terminal and the image forming apparatus are recognized using near field wireless communication. When acquiring authentication data from the mobile information terminal via near field wireless communication, the image processing apparatus performs user authentication on the basis of the acquired authentication data. If the user authentication is successful, the image processing apparatus changes the operation mode to the operating mode corresponding to the application currently running on the mobile information terminal. Then, the job transmitted from the mobile information terminal is preferentially executed by the image forming apparatus (see, for example, Japanese Unexamined Patent Application No. 2016-005073).

Many image processing apparatuses installed in offices have a user authentication function to ensure billing management and security of the data handled. A typical way of user authentication is to identify a user using identification information consisting of a user name and a password. When this function is applied to non-contact operation, the user's mobile communication terminal transmits identification information such as user name and password to the image processing apparatus. If identification information is exchanged while the mobile communication terminal is connected to the Internet as described above, even if exchanged on an intranet, the risk of information leakage over the Internet path becomes an issue. That is, when identification information, subsequent operation instructions, and responses to them are transmitted and received over the Internet, they may be intercepted and analyzed by third parties, increasing the possibility of spoofing. This would increase the risk of information handled by the image processing apparatus or stored in the image processing apparatus being leaked. When communicating with the image processing apparatus via a server, the risk of leakage of the information stored in the server also increases.

One method to avoid such risk is, for example, to operate the image processing apparatus directly to authenticate the user, and then perform non-contact operation using a mobile communication terminal. However, that does not constitute complete non-contact operation.

It is also conceivable that the image processing apparatus is provided with a Near Field Communication (NFC) reader, and the NFC reader performs non-contact user authentication using an IC card for each user and then performs a non-contact operation. However, in this case, an IC card for user authentication must be prepared separately from the mobile communication terminal.

It is not inconceivable that a mobile communication terminal transmits an operation instruction to an image processing apparatus via near field wireless communication such as NFC or Bluetooth without going through the Internet. However, since the speed of near field wireless communication is usually slower than that of Internet communication, it takes time when exchanging a lot of information, for example, operation instructions for starting a job, which may lead to user dissatisfaction.

If the image processing apparatus is connected via the Internet to an external server, for example, a server that provides a service, and the user's mobile communication terminal communicates with the image processing apparatus via that server, the following measure is possible. The authentication information (e.g., user name and password) used by the user to log in to the server is also used to secure the communication between the server and the image processing apparatus. For example, the authentication information is used as a cryptographic key to encrypt the data exchanged between the server and the image processing apparatus. In this way, a certain level of information security can be ensured. However, it can be said that the cipher can be deciphered with time.

One aspect of the present disclosure has been made in consideration of the above circumstances, and is to enable operations on an image processing apparatus, including user authentication, to be performed easily from a communicatively connected mobile communication terminal in a non-contact manner and with information security taken into consideration.

SUMMARY OF THE INVENTION

One aspect of the present disclosure provides an image processing apparatus including an apparatus information generator that generates apparatus information including apparatus identification information, an authenticator that performs non-contact user authentication with a communication terminal by using communication without the Internet or by capturing image information, and a job controller that causes the communication terminal whose user has been authenticated by the authenticator to acquire the apparatus information by using communication without the Internet or by providing the apparatus information as image information, and that causes an apparatus corresponding to the apparatus information to execute a job on a basis of the apparatus information transmitted from the communication terminal via the Internet and setting information related to job execution.

Further, from a different point of view, one aspect of the present disclosure provides an image processing method for a controller of an image processing apparatus. The image processing method includes generating apparatus information including apparatus identification information, performing non-contact user authentication with a communication terminal by using communication without the Internet or by capturing image information, causing the communication terminal whose user has been authenticated to acquire the apparatus information by using communication without the Internet or by providing the apparatus information as image information, and causing an apparatus corresponding to the apparatus information to execute a job on a basis of the apparatus information transmitted from the communication terminal via the Internet and setting information related to job execution.

The image processing apparatus according to one aspect of the present disclosure can enable operations on an image processing apparatus, including user authentication, to be performed easily from a communicatively connected mobile communication terminal in a non-contact manner and with information security taken into consideration.

The image processing method according to one aspect of the present disclosure also exhibits similar operational effects.

BRIEF DESCRIPTION OF THE DRAWINGS

FIGS. 10A to 10C are explanatory diagrams illustrating an example of an operation of reading identification information displayed on the operation unit of the multifunction peripheral in the application of the mobile communication terminal illustrated in FIG. 1.

DETAILED DESCRIPTION OF THE INVENTION

One aspect of the present disclosure will be described below in further detail with reference to the accompanying drawings. The following description is illustrative in all respects, and should not be construed to limit the present disclosure.

First Embodiment

Figure 1:
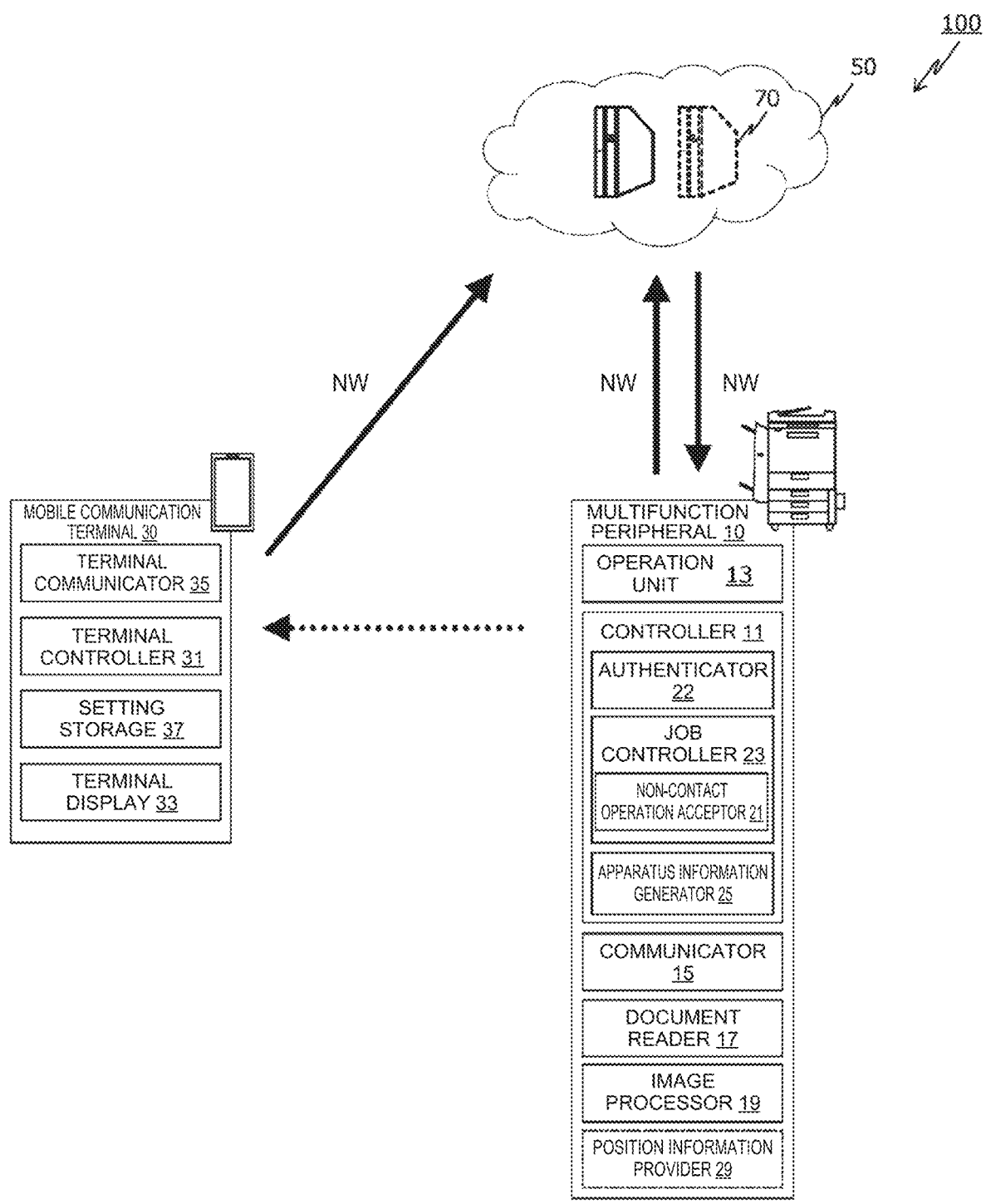
FIG. 1 is a block diagram schematically illustrating an overall configuration of an image processing system according to this embodiment.

FIG. 1 is a diagram schematically illustrating an overall configuration of an image processing system 100 according to a first embodiment. The image processing system 100 includes a multifunction peripheral 10 as an image processing apparatus, a mobile communication terminal 30, and a network service 50. It is also conceivable to provide an external authentication server 70 (illustrated by a chain line in FIG. 1) and perform user authentication for the multifunction peripheral 10 not by the network service 50 but by the external authentication server 70.

The multifunction peripheral 10 is communicatively connected to the network service 50 via a network (NW) illustrated by a solid line in FIG. 1. The network (NW) communicates via the Internet. The mobile communication terminal 30 is communicatively connected to the network service 50 via a network (NW). Further, the mobile communication terminal 30 is configured to acquire identification information described below from the multifunction peripheral 10 (see the chain arrow in the figure).

It is assumed that the user of the mobile communication terminal 30 has an account registered in the network service 50 and is in a state where the network service 50 can be used. If an external authentication server 70 is provided, the multifunction peripheral 10 is also communicatively connected to the external authentication server 70. The external authentication server 70 authenticates users for use of the 50 network services. If an external authentication server 70 is not provided, the network service 50 is responsible for the user authentication processing.

The multifunction peripheral 10 is an image processing apparatus that, for example, may scan a paper medium document as an input material and form an image on a paper, and thus output a printed material. The multifunction peripheral 10 is also an output apparatus that may output electronic data in a predetermined format (e.g., portable document format (PDF)) on the basis of the scan data of a document. The input material is not limited to paper medium documents. For example, it can be electronic data input from an external storage medium or external device.

The multifunction peripheral 10 is equipped with a controller 11, an operation unit 13, a communicator 15, a document reader 17 and an image processor 19. The controller 11 includes hardware resources, mainly a processor, and software resources of programs for controlling the multifunction peripheral 10. The processor executes a control program to implement the functions of the controller 11. The controller 11 includes an authenticator 22, a job controller 23, and an apparatus information generator 25. The job controller 23 includes a non-contact operation acceptor 21. The apparatus information generator 25 generates an identification information code R2 and a session code described below. The operation unit 13 accepts user operations and displays responses to operations, the state of the multifunction peripheral 10, and notifications to the user. The communicator 15 is a communication circuit and communication control firmware that communicates with an external device via the network NW.

The document reader 17 reads a paper medium document. The image processor 19 performs processing for the image read by the document reader 17 and processing for printing the image. That is, the image processor processes and prints the read document or the image data received from external devices, or transmits the image data to external devices. Further, the multifunction peripheral 10 may also be equipped with a position information provider 29 that provides the position where the multifunction peripheral 10 is installed. The position information provider may detect the position of the multifunction peripheral 10 with the use of, for example, a function such as a GPS (Global Positioning System). However, the position information provider may simply hold position information. For example, the position information of the multifunction peripheral 10 positioned by an external device using GPS is stored in a referenceable manner.

The mobile communication terminal 30 is equipped with a terminal controller 31, a terminal display 33, a terminal communicator 35 and a setting storage 37. The terminal controller 31 includes hardware resources, mainly a processor, and processing programs such as an OS (Operating System) and applications executed by the processor. The processor executes a processing program to implement the functions of the terminal controller 31. The terminal display 33 provides displays related to applications executed by the processor and screens for launching such applications. The terminal communicator 35 is a communication circuit and communication control firmware that communicates with an external device via the network NW. The setting storage 37 is a storage area on a storage device such as a RAM (Random Access Memory) that stores the settings of a job to be executed by the multifunction peripheral 10.

The respective processings of the multifunction peripheral 10, mobile communication terminal 30, and network service 50 in this embodiment will be described with reference to FIGS. 4 to 12 in accordance with the flowcharts of FIGS. 2 and 3.

The controller 11 of the multifunction peripheral 10 performs processing as the authenticator 22 and the job controller 23.

Figure 4:
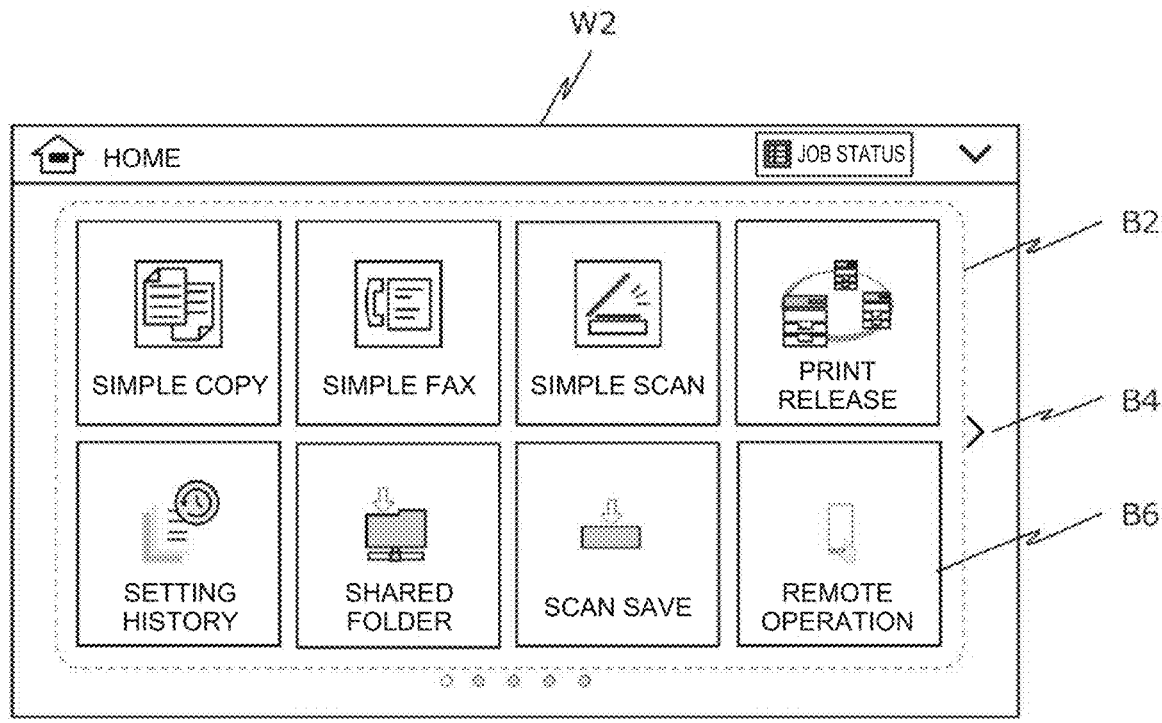
FIG. 4 is an explanatory diagram illustrating an example of a home screen displayed on the operation unit of a multifunction peripheral illustrated in FIG. 1.

When the controller 11 of the multifunction peripheral 10 is turned on, returns from the power-saving mode, or transitions to the initial state without any operation for a predetermined period of time, the controller 11 displays a home screen W2 illustrated in FIG. 4 on the operation unit 13 (step S10).

The home screen W2 illustrated in FIG. 4 is an operation screen that receives the user's selection of a job and selection of various functions. The home screen W2 illustrated in FIG. 4 has eight job/function selection buttons B2. In addition, a display forward button B4 is disposed to switch the display to the hidden job/function selection buttons. The job/function selection button B2 accepts the selection of the job, function display, or the like, desired by the user.

For example, when the tap operation of the [Simple Copy] button disposed at the left end of the upper row of the job/function selection buttons B2 illustrated in FIG. 4 is accepted, the controller 11 accepts the selection of a copy job. Then, a screen (not illustrated) that accepts the function settings for the selected [Simple Copy] is displayed. The function setting items accepted on that function setting screen correspond to a copy job setting screen W28 of a non-contact operation application described below. Further, one of the job/function selection buttons B2 illustrated in FIG. 4 is a remote operation button B6. When the tap operation of the remote operation button B6 is accepted by the user, the controller 11 transitions the home screen W2 to a non-contact operation acceptance screen W4 illustrated in FIG. 5. The disposition of the job/function selection buttons B2 illustrated in FIG. 4 can be set and changed by the user. The same is true for the hidden job/function selection buttons that are displayed by operating the display forward button B4.

Figure 5:
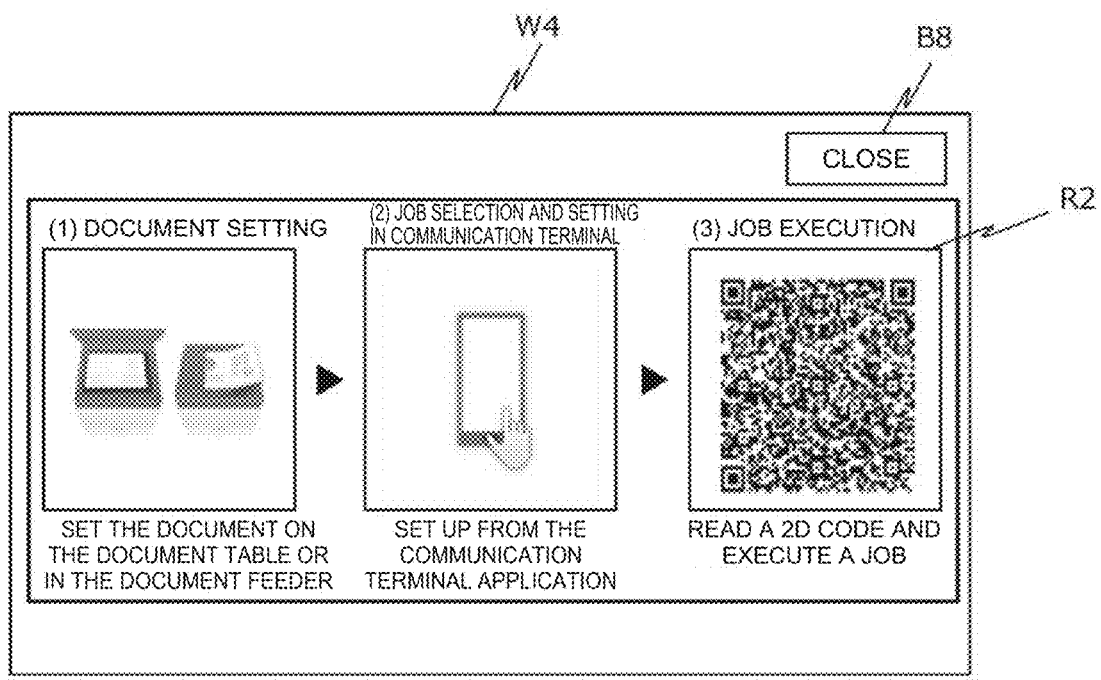
FIG. 5 is an explanatory diagram illustrating an example of a screen for explaining a procedure for non-contact operation displayed on the operation unit of the multifunction peripheral illustrated in FIG. 1.

When the tap operation of the remote operation button B6 is accepted on the home screen W2 illustrated in FIG. 4, in response to this, the controller 11 transitions the home screen W2 to a non-contact operation acceptance screen W4 illustrated in FIG. 5.

The non-contact operation acceptance screen W4 displays an explanation of the operation procedure for remote operation (non-contact operation) for the multifunction peripheral 10. A [Close] button B8 is disposed in the upper right corner. When the [Close] button B8 is operated, the controller 11 changes the non-contact operation acceptance screen W4 back to the home screen W2, and ends the remote operation acceptance. The user can operate any of the other job/function selection buttons B2 disposed on the home screen W2 to select a job, set the functions of the selected job with the use of the operation unit 13, and execute the job. While the non-contact operation acceptance screen W4 is displayed, job selection and function setting cannot be performed using the operation unit 13.

As illustrated in FIG. 5, the explanation of the operation procedure displayed on the non-contact operation acceptance screen W4 is an illustration or animation. The operation procedure is described in the order of items (1) to (3) of (1) document setting, (2) job selection and function setting by operation using a mobile communication terminal, and (3) job execution.

In the item (3) in the description of the operation procedure, an identification information code R2 related to the identification information for identifying the multifunction peripheral 10 from other apparatuses on the network NW. In the example illustrated in FIG. 5, the identification information is encoded in a two-dimensional code. The way of transmitting the identification information as image information is not limited to two-dimensional codes. For example, the identification information can be encoded using at least any of bar codes, symbols, and alphanumeric characters. The displayed two-dimensional code or other image information can be read by a camera or laser-based scanning device to transmit the encoded identification information to the mobile communication terminal 30. In this embodiment, by causing the camera of the mobile communication terminal 30 to read the identification information code R2, the mobile communication terminal 30 acquires the identification information of the multifunction peripheral 10 without going through the Internet.

In addition to transmitting identification information using image information such as a two-dimensional code, it is also possible to transmit identification information without going through the Internet by using near field wireless communication such as NFC or Bluetooth or medium-range wireless communication compliant with Direct Wi-Fi.

Figure 2:
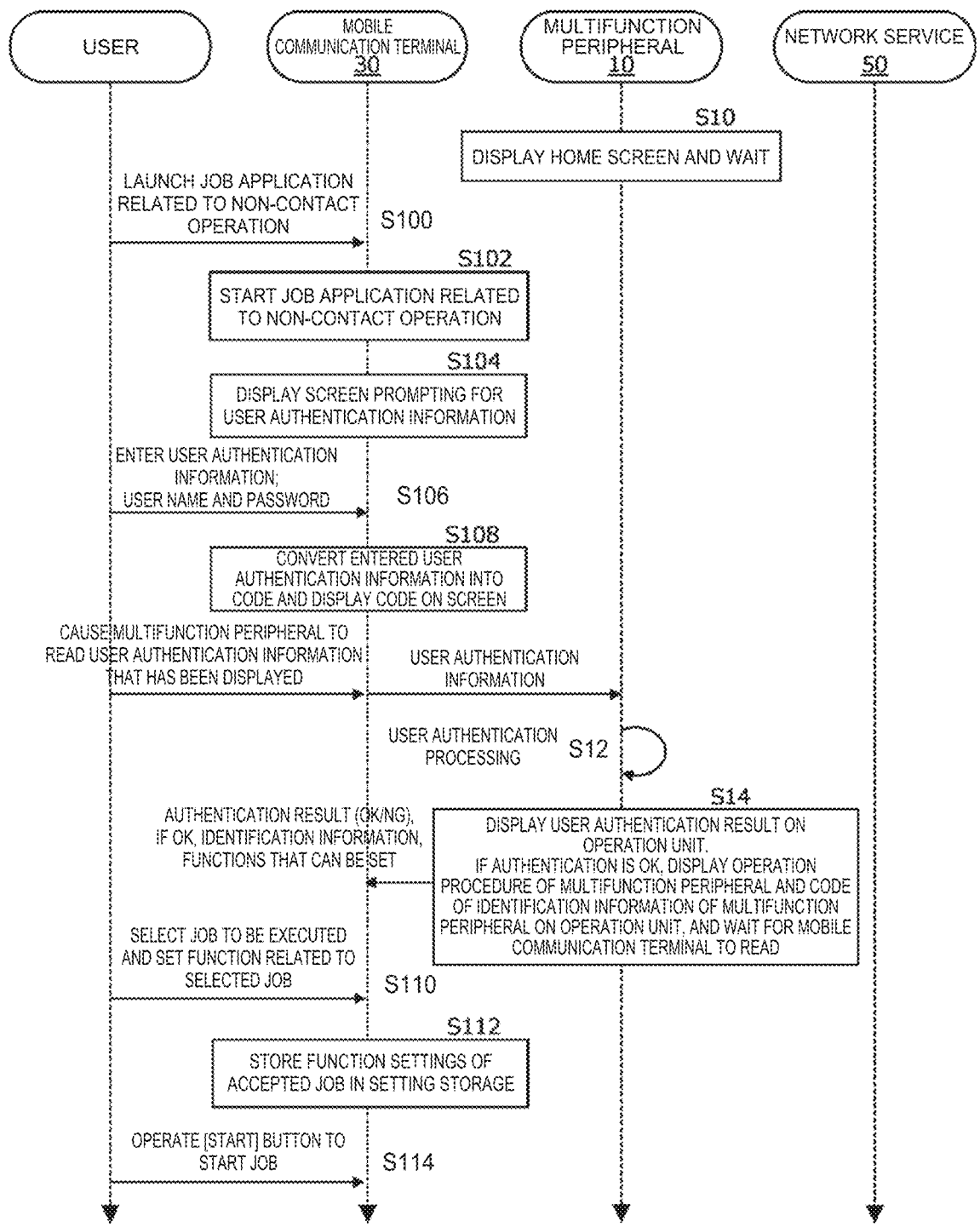
FIG. 2 is a first flowchart illustrating an example of processing according to a first embodiment.

However, the flowchart illustrated in FIG. 2 indicates the procedure when the application for performing the non-contact operation of the mobile communication terminal 30 is started and the user authentication with the multifunction peripheral 10 is successful before the remote operation button B6 is operated, that is, in the state where the home screen W2 is displayed. According to that procedure, the user can initiate a non-contact operation without touching the operation unit 13 of the multifunction peripheral 10 at all.

The user instructs the application installed in the mobile communication terminal 30 to start (see step S100 illustrated in FIG. 2). An application that provides non-contact job setting and start instructions to the multifunction peripheral 10 is hereafter referred to as a non-contact operation application. The mobile communication terminal 30 shall have its non-contact operation application installed in advance. The terminal controller 31 of the mobile communication terminal 30 accepts a user's operation to instruct to start a non-contact operation application, and starts the application (step S102).

That is, the terminal controller 31 executes the processing program for the non-contact operation application.

Figure 6A:
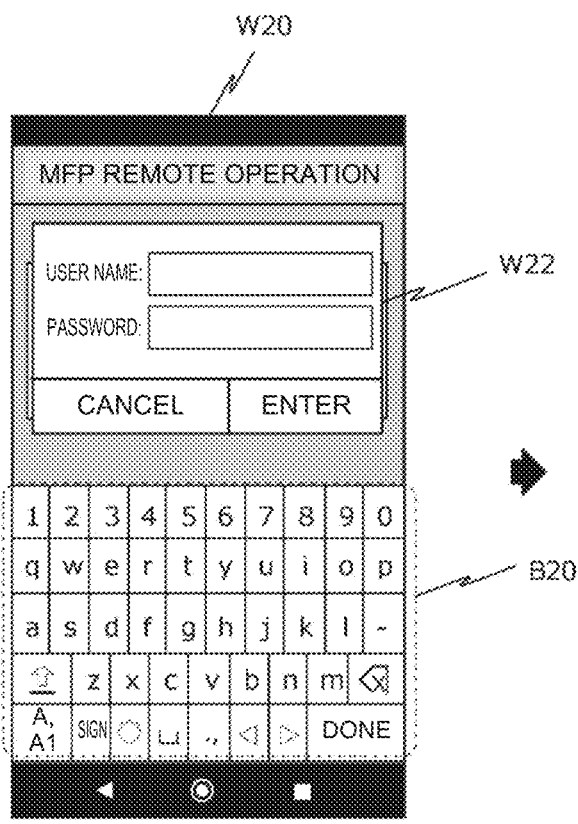
FIGS. 6A and 6B are explanatory diagrams illustrating an input screen of user authentication information in an application executed by a mobile communication terminal illustrated in FIG. 1.

In this embodiment, the terminal controller 31 that executes the non-contact operation application first performs user authentication processing when the non-contact operation application is started. This processing authenticates users who are authorized to perform operations on the multifunction peripheral 10. This is similar to the user authentication performed using the operation unit 13 of the multifunction peripheral 10. As illustrated in FIG. 6A, the terminal controller 31 causes the terminal display 33 to display a user authentication screen W20 prompting for the user name and password required to operate the multifunction peripheral 10 (step S104). In the user authentication screen W20, an authentication information input window W22 for accepting a user name and password input and alphanumeric keys B20 are superimposed and displayed on the application basic screen.

Figure 6B:
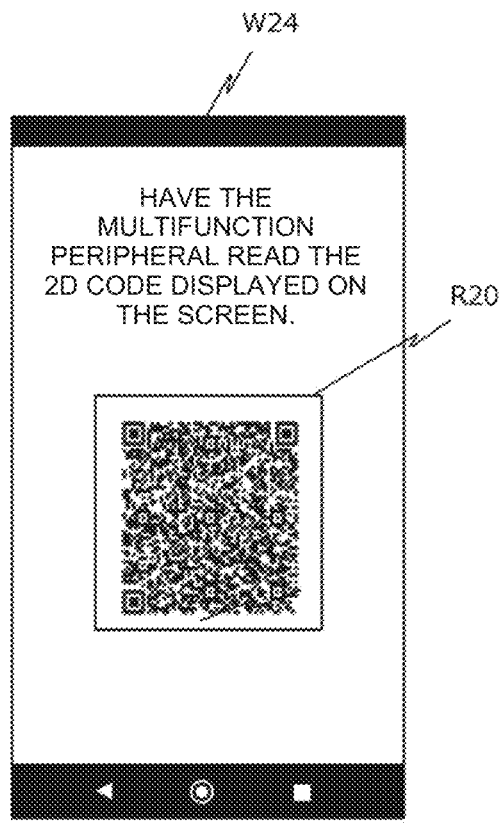

When a user name and password are entered by the user in the authentication information input window W22 (step S106), the terminal controller 31 generates a two-dimensional code based on the entered user authentication information and displays the two-dimensional code on the screen (step S108). FIG. 6B illustrates a screen (authentication information code display screen W24) in which an authentication information code R20 based on the entered user authentication information is displayed on the terminal display 33. The user causes a camera (not illustrated in FIG. 1) or the document reader 17 of the multifunction peripheral 10 to read the authentication information code R20 displayed on the terminal display 33, thereby transmitting the user authentication information from the mobile communication terminal 30 to the multifunction peripheral 10 in a non-contact manner and without going through the Internet. In addition to exchanging user authentication information using such a code, the user authentication information may be directly exchanged without going through the Internet by using near field wireless communication such as NFC or Bluetooth or medium-range wireless communication compliant with Direct Wi-Fi.

The user authentication described above involves the user entering a user name and a password into the mobile communication terminal 30, but as another method, an embodiment in which the mobile communication terminal 30 performs biometric authentication of the user can be considered. Many of the recent mobile communication terminals 30 have the ability to read a user's biometric image, such as a fingerprint or face, and perform authentication based on features unique to the user. By linking the biometric authentication function to the user authentication processing of the multifunction peripheral 10, it is possible to eliminate the need for the user to enter a user name and password each time.

In this way, the multifunction peripheral 10 acquires user authentication information from the mobile communication terminal 30 by any of the camera, document reader 17, near field wireless communication, medium-range wireless communication, or the like, without going through the Internet, and performs user authentication processing as the authenticator 22 (step S12). Then, the user authentication result (OK or NG) is then displayed on the operation unit 13 in a manner that the user can recognize.

The user authentication using the mobile communication terminal 30 may be performed before the operation of the remote operation button B6 is accepted, that is, in a state where the home screen W2 illustrated in FIG. 4 is displayed on the operation unit 13. If the user authentication result is OK, the controller 11 switches the home screen W2 to the non-contact operation acceptance screen W4 illustrated in FIG. 5 at this point (step S14). Then, as illustrated in step S124 described below, the controller 11 waits for the mobile communication terminal 30 to transmit the instruction related to the start of job execution and the data related to the function setting of the job via the Internet.

While the non-contact operation acceptance screen W4 is displayed on the operation unit 13, the controller 11 of the multifunction peripheral 10 accepts only an operation instruction from the mobile communication terminal 30. The controller 11 does not accept an operation by other users using the operation unit 13 or a remote operation from devices other than the mobile communication terminal 30. This avoids conflicting operating instructions for the multifunction peripheral 10.

If the user authentication is successful (result OK) in step S14 above and the non-contact operation acceptance screen W4 is displayed on the operation unit 13, the user will see the operation procedure displayed on the non-contact operation acceptance screen W4 at that point.

The user sets a paper medium document in the multifunction peripheral 10 in accordance with the operation procedure (1) on the non-contact operation acceptance screen W4. If the non-contact operation application of the mobile communication terminal 30 has not been started yet, the non-contact operation application is started here in accordance with the operation procedure (2) to select a job and set functions for the selected job.

Figure 7:
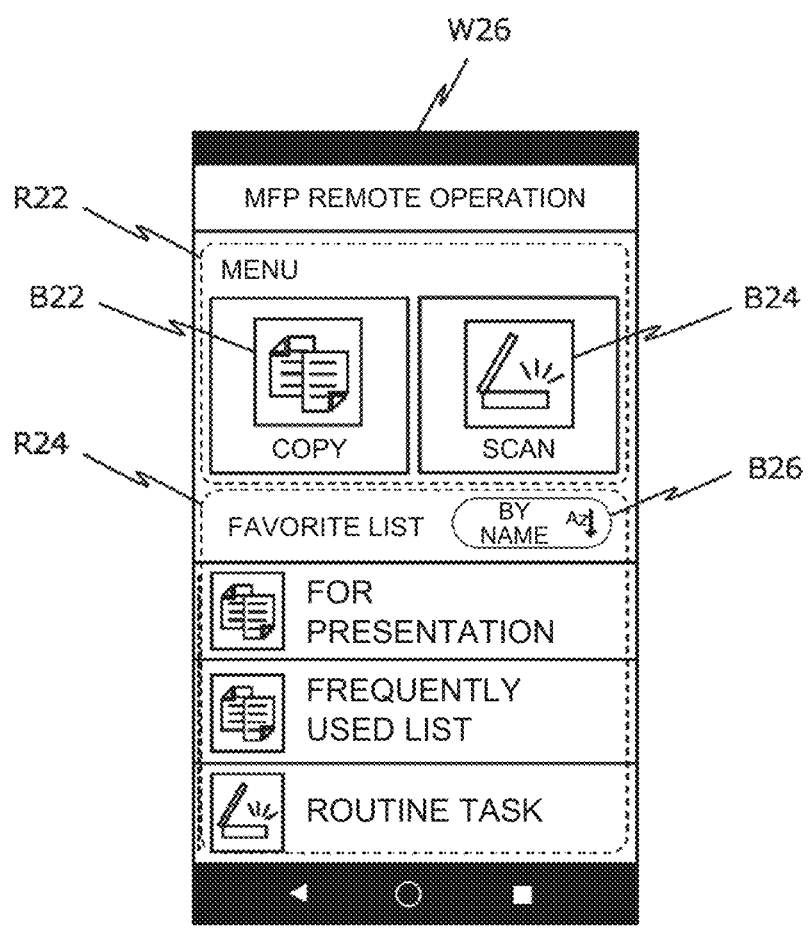
FIG. 7 is an explanatory diagram illustrating an example of a basic screen in the application of the mobile communication terminal illustrated in FIG. 1.

After the user launches the non-contact operation application, the terminal controller 31 of the mobile communication terminal 30 causes the terminal display 33 to display an application basic screen W26 of the non-contact operation application illustrated in FIG. 7. Then, the non-contact operation application accepts the user's job selection and function settings for the selected job (step S110). Then, the accepted job selection and job function settings are then stored in the setting storage 37 (step S112).

FIGS. 7 to 9 are explanatory diagrams illustrating the operation screens of the non-contact operation application. Each operation screen is described below.

FIG. 7 is an example of the basic screen of the non-contact operation application. The application basic screen W26 illustrated in FIG. 7 includes a menu display area R22 and a favorite list display area R24.

In the example illustrated in FIG. 7, a copy job selection button B22 and a scan job selection button B24 are disposed in the menu display area R22. The copy job selection button B22 accepts the selection of a copy job. When the tap operation of the copy job selection button B22 is accepted, the terminal controller 31 determines that the copy job has been selected by the user. Then, the terminal controller 31 switches the application basic screen W26 to the copy job setting screen W28 illustrated in FIG. 8A to accept function settings related to the copy job and an instruction to start the copy job.

Meanwhile, when the tap operation of the scan job selection button B24 is accepted, the terminal controller 31 determines that the scan job has been selected by the user. Then, the terminal controller 31 switches the application basic screen W26 to a scan job setting screen W32 illustrated in FIG. 9A to accept function settings related to the scan job and an instruction to start the scan job.

The favorite list display area R24 illustrated in FIG. 7 is an area where the user can select frequently used items and set them to be displayed in a list format. The ascending and descending order display of the favorite list may be switched by a sort button B26.

Figure 8A:
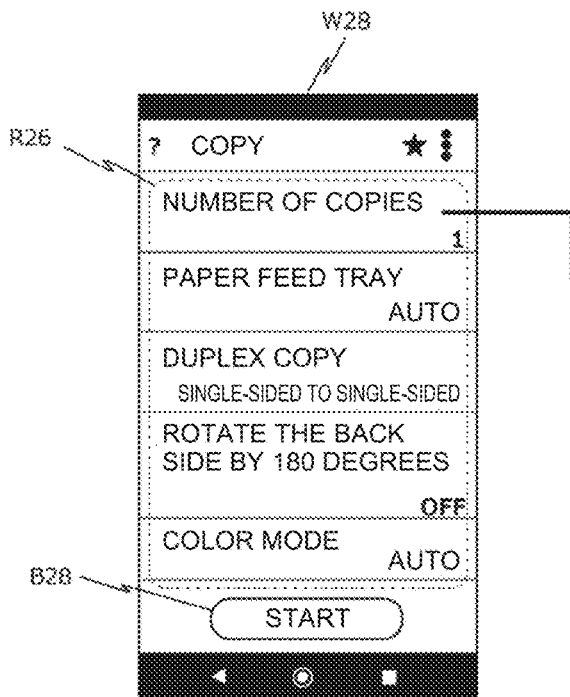
FIGS. 8A and 8B are explanatory diagrams illustrating an example of a screen related to the function settings of a copy job in the application of the mobile communication terminal illustrated in FIG. 1.
Figure 8B:
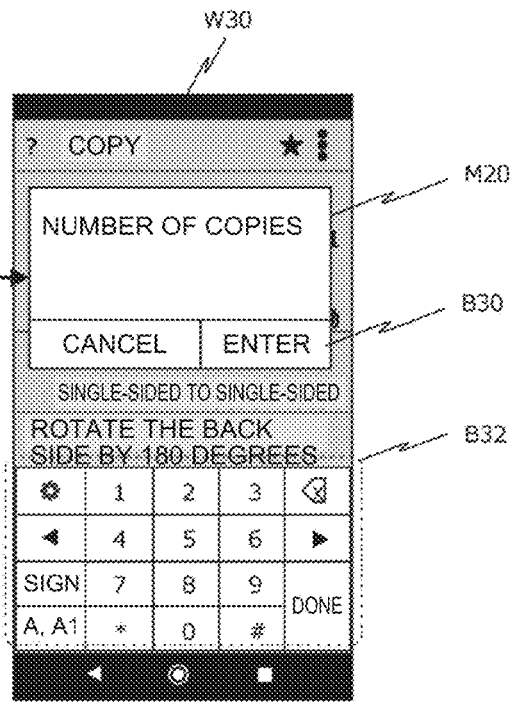

FIGS. 8A and 8B are examples of the copy job setting screen. The copy job setting screen W28 in FIG. 8A includes a function setting area R26 and a [Start] button B28.

The function setting area R26 accepts settings for various function items related to the copy job. The function setting area R26 illustrated in FIG. 8A accepts settings for items such as [Number of copies], [Paper feed tray], [Duplex copy], [Rotate the back side by 180 degrees], and [Color mode]. For example, if the function setting of [Number of copies] is selected by a tap operation as the function setting, as illustrated in FIG. 8B, the terminal controller 31 superimposes and displays a number of copies setting screen W30 including a modal M20 and kana/numeric keys B32 on the copy job setting screen W28. This is the number of copies setting screen W30.

On the number of copies setting screen W30, the terminal controller 31 accepts an operation of setting the number of copies to the modal M20 with the use of the kana/numeric keys B32. After the number of copies is set, when the tap operation of an [Enter] button B30 is accepted, the terminal controller 31 confirms the setting of the number of copies and changes the number of copies setting screen W30 back to the copy job setting screen W28. When the [Cancel] button to the left of the [Enter] button B30 is tapped, the terminal controller 31 does not confirm the setting of the number of copies and changes the number of copies setting screen W30 back to the copy job setting screen W28.

Figure 9A:
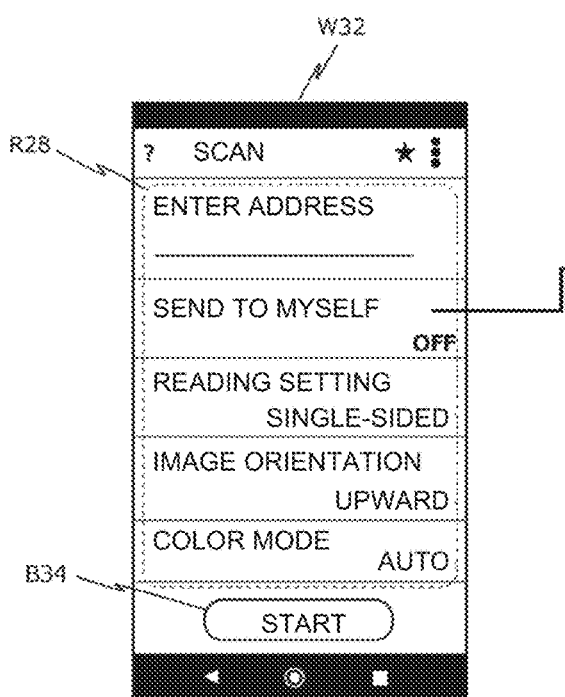
FIGS. 9A and 9B are explanatory diagrams illustrating an example of a screen related to the function settings of a scan job in the application of the mobile communication terminal illustrated in FIG. 1.
Figure 9B:
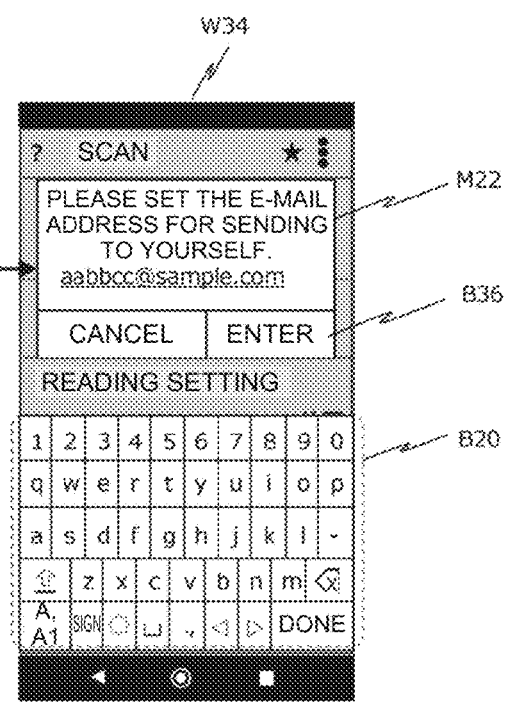

FIGS. 9A and 9B are examples of the scan job setting screen. The scan job setting screen W32 in FIG. 9A includes a function setting area R28 and a [Start] button B34.

The function setting area R28 accepts settings for various function items related to the scan job. In FIG. 9A, the function setting area R28 accepts settings for items such as [Enter Address], [Send to Myself], [Reading Setting], [Image Orientation], and [Color Mode]. FIG. 9B illustrates an example of a self-addressed mail setting screen W34 displayed when the tap operation of [Send to Myself] is accepted. On the self-addressed mail setting screen W34 illustrated in FIG. 9B, a modal M22 for accepting the input of the self-addressed mail address and the alphanumeric keys B20 are superimposed and displayed on the scan job setting screen W32.

On the self-addressed mail setting screen W34, the terminal controller 31 accepts the input operation of the self-addressed mail address. After the self-addressed mail address is entered, when the tap operation of an [Enter] button B36 is accepted, the terminal controller 31 confirms the setting of the self-addressed mail address and changes the self-addressed mail setting screen W34 back to the original scan job setting screen W32. When the [Cancel] button to the left of the [Enter] button B36 is tapped, the terminal controller 31 does not confirm the setting of the self-addressed mail address and changes the self-addressed mail setting screen W34 back to the scan job setting screen W32.

The operation screens of the non-contact operation application such as those illustrated in FIG. 7 to FIGS. 9A and 9B accept the same function settings as those accepted by the controller 11 of the multifunction peripheral 10 via the operation unit 13.

The job selection is accepted on the application basic screen W26 illustrated in FIG. 7, and the function settings of the selected job are accepted on the copy job setting screen W28 illustrated in FIG. 8A and the scan job setting screen W32 illustrated in FIG. 9A. Once the settings related to those jobs are completed, the user taps the [Start] key to instruct the execution of the job (step S114).

Figure 3:
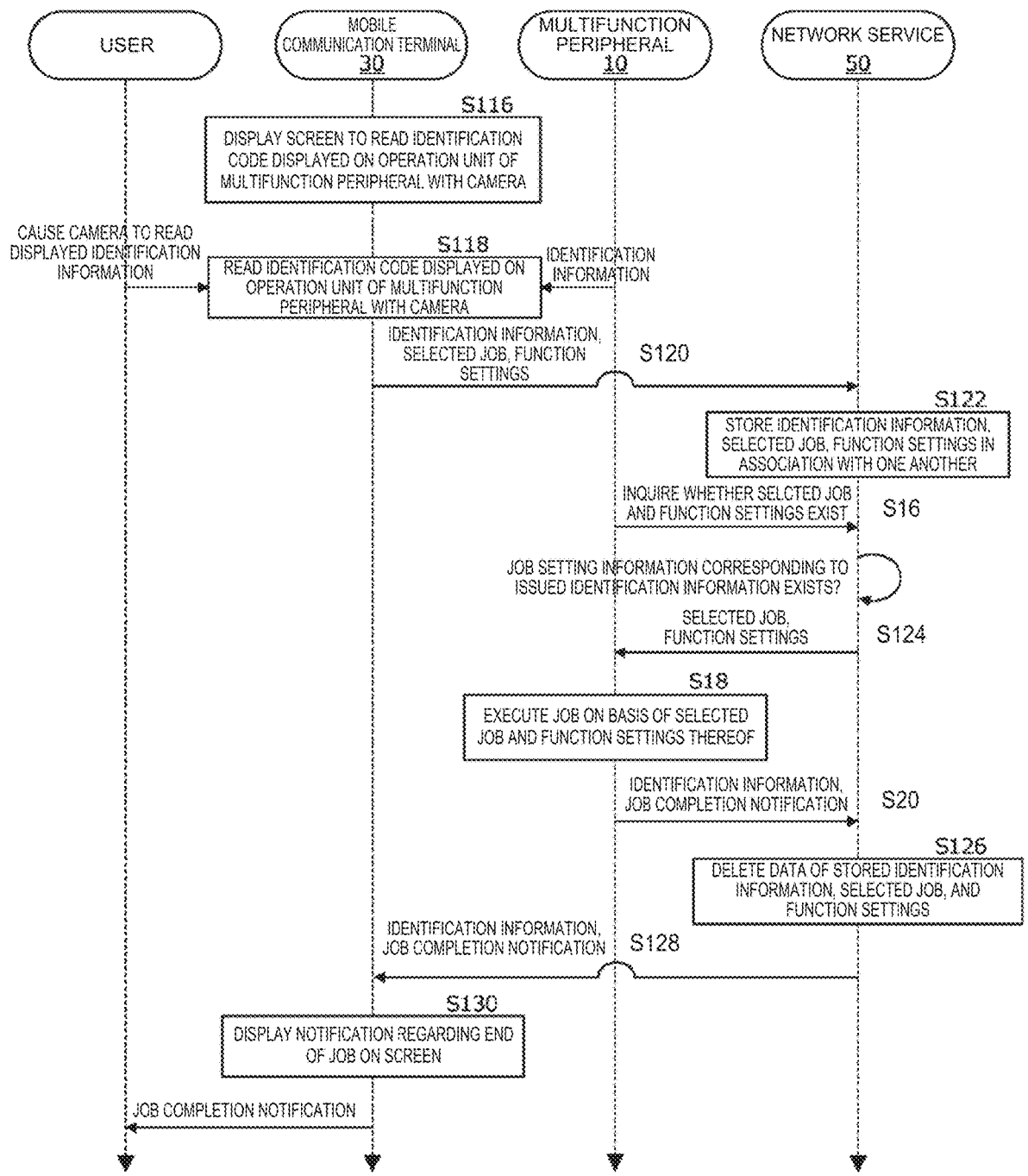
FIG. 3 is a second flowchart illustrating an example of processing according to the first embodiment.

When the tap operation of the [Start] button B28 illustrated in FIG. 8A or the [Start] button B34 illustrated in FIG. 9A is accepted, the terminal controller 31 causes the terminal display 33 to display an identification information code reading screen W36 illustrated in FIG. 10A (step S116 illustrated in FIG. 3). The identification information code reading screen W36 is a screen related to an operation in which the identification information code R2 displayed on the non-contact operation acceptance screen W4 of the multifunction peripheral 10 is read by the camera (not illustrated in FIG. 1) of the mobile communication terminal 30.

As illustrated in FIG. 10A, a code reading frame R30 and a message R32 are disposed on the identification information code reading screen W36 in order to read the identification information code R2 at a predetermined position, and an image read by the camera is displayed. The initially displayed message R32 instructs the camera to read the identification information code R2 displayed on the operation unit of the multifunction peripheral 10. When the user adjusts the identification information code R2 displayed on the operation unit of the multifunction peripheral 10 to the code reading frame R30 (see FIG. 10B), the terminal controller 31 that executes the non-contact operation application recognizes the identification information code R2 and extracts the identification information embedded in the identification information code R2 (step S118).

Thereby, the identification information of the multifunction peripheral 10 is transmitted directly from the multifunction peripheral 10 to the mobile communication terminal without going through the Internet.

In addition to exchanging identification information using such a code, the identification information of the multifunction peripheral 10 may be directly exchanged without going through the Internet by using near field wireless communication such as NFC or Bluetooth or medium-range wireless communication compliant with Direct Wi-Fi. That is, at the timing of displaying the above-mentioned identification information code reading screen W36, identification information may instead be transmitted via near field wireless communication or medium-range wireless communication. The terminal controller 31 that has acquired the identification information of the multifunction peripheral 10 transmits the identification information and the selected job and the function settings stored in the setting storage 37 to the network service 50 (step S120). At the time of the transmission to the network service 50, the terminal controller 31 displays a message R34 indicating that data related to non-contact operation is being transmitted, as an alternative to the above-mentioned message R32 (see FIG. 10B). Furthermore, when the data transmission is completed, a message R36 indicating that the transmission is completed is displayed (see FIG. 10C). An [OK] button is disposed on the message R36, and when that [OK] button is tapped, the terminal controller 31 switches the display of the identification information code reading screen W36 to the application basic screen W26.

The network service 50 that has received the selected job and the function settings from the multifunction peripheral 10 together with the identification information of the multifunction peripheral 10 associates these data, attaches a job ID for identifying and managing the job to the data, and stores the data in a memory (step S122).

The multifunction peripheral 10 performs HTTPS long polling to the network service 50 and inquires whether the job setting information corresponding to the identification information of the multifunction peripheral 10 exists (step S16).

When the job setting information corresponding to the identification information of the multifunction peripheral 10 exists, the network service 50 establishes a connection with the multifunction peripheral 10 and transmits the job setting information stored in the memory to the multifunction peripheral 10 (step S124).

Upon receiving the selected job and function settings related to the new job from the network service 50, as the job controller 23 of the multifunction peripheral 10, the controller 11 executes a job on the basis of the received selected job and function settings (step S18).

Figure 11:
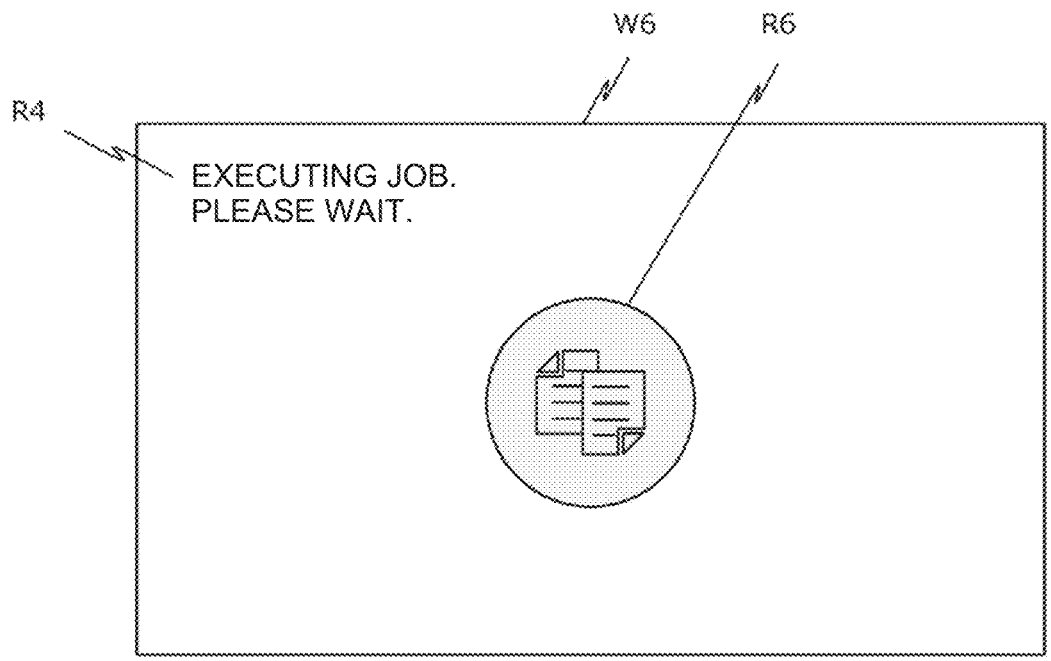
FIG. 11 is an explanatory diagram illustrating an example of a screen displayed on the operation unit of the multifunction peripheral illustrated in FIG. 1 during job execution.
Figure 12:
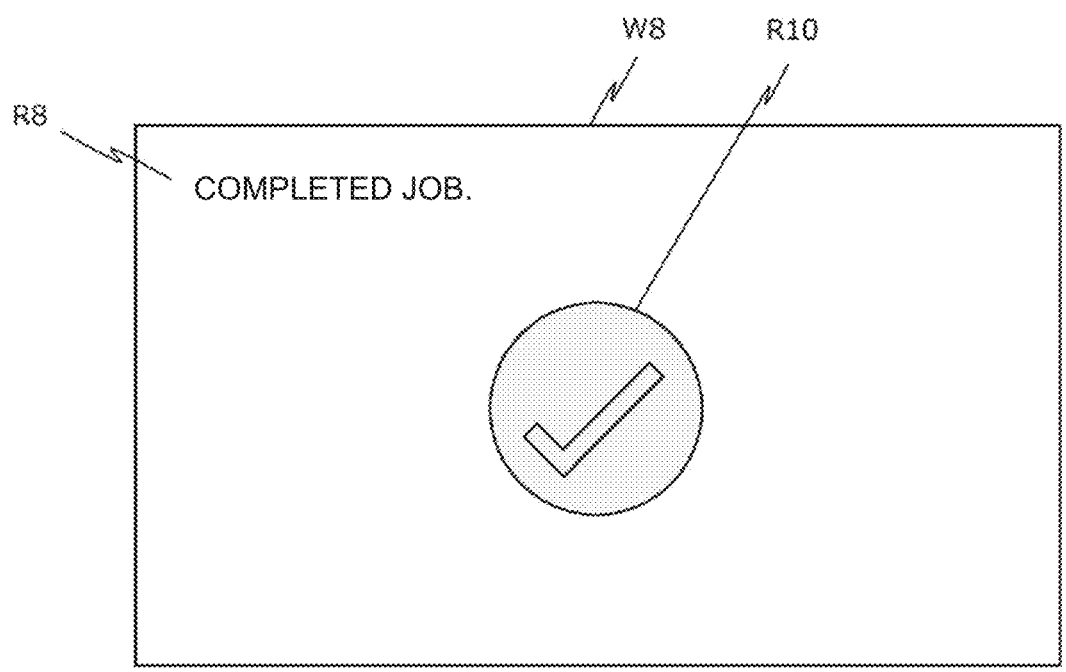
FIG. 12 is an explanatory diagram illustrating an example of a screen of the multifunction peripheral displayed on the operation unit of the multifunction peripheral illustrated in FIG. 1.

During the job execution, the controller 11 causes the operation unit 13 to display a remote job execution screen W6 illustrated in FIG. 11. On the remote job execution screen W6, a message R4 and a job icon R6 notifying the user that the job is being executed are disposed.

When the job execution is completed, the controller 11 transmits a job completion notification along with the identification information to the network service 50 (step S20). Furthermore, the remote job execution screen W6 is switched to a remote job completion screen W8 illustrated in FIG. 12 and displayed for a predetermined period of time. On the remote job completion screen W8, a message R8 and a job icon R10 notifying the user that the job is completed are disposed. Upon receiving the job completion notification from the multifunction peripheral 10, the network service 50 deletes the data related to the corresponding job stored in the memory (step S126). Along with that, a job completion notification and the identification information of the multifunction peripheral 10 are transmitted to the mobile communication terminal 30 (step S128).

Upon receiving the job completion notification from the network service 50, the terminal controller 31 causes the terminal display 33 to display that the job related to the multifunction peripheral 10 has been completed, and to notify the user (step S130).

The above is the flow of processing executed by each of the multifunction peripheral 10, mobile communication terminal 30, and network service 50 regarding user authentication by non-contact and non-contact operation.

Second Embodiment

The first embodiment is an example of a flow in which the user authentication of the multifunction peripheral 10 is performed immediately after the non-contact operation application is started. In contrast, in this embodiment, identification information is acquired from the multifunction peripheral 10 to prevent confusion with other jobs, but no user authentication is performed until the start of a job is instructed in the non-contact operation application. The selection of a job and the setting of the function items of that job are then accepted by the non-contact operation application. When the start of a job is instructed in that non-contact operation application, user authentication should be performed at that point.

By doing so, another user can operate the non-contact operation application in parallel on a mobile communication terminal other than the mobile communication terminal 30, and can select a job and set functions for the multifunction peripheral 10. Note that the phases of job execution after the user authentication are exclusive. Thus, no job confusion occurs during the execution phase.

Figure 13:
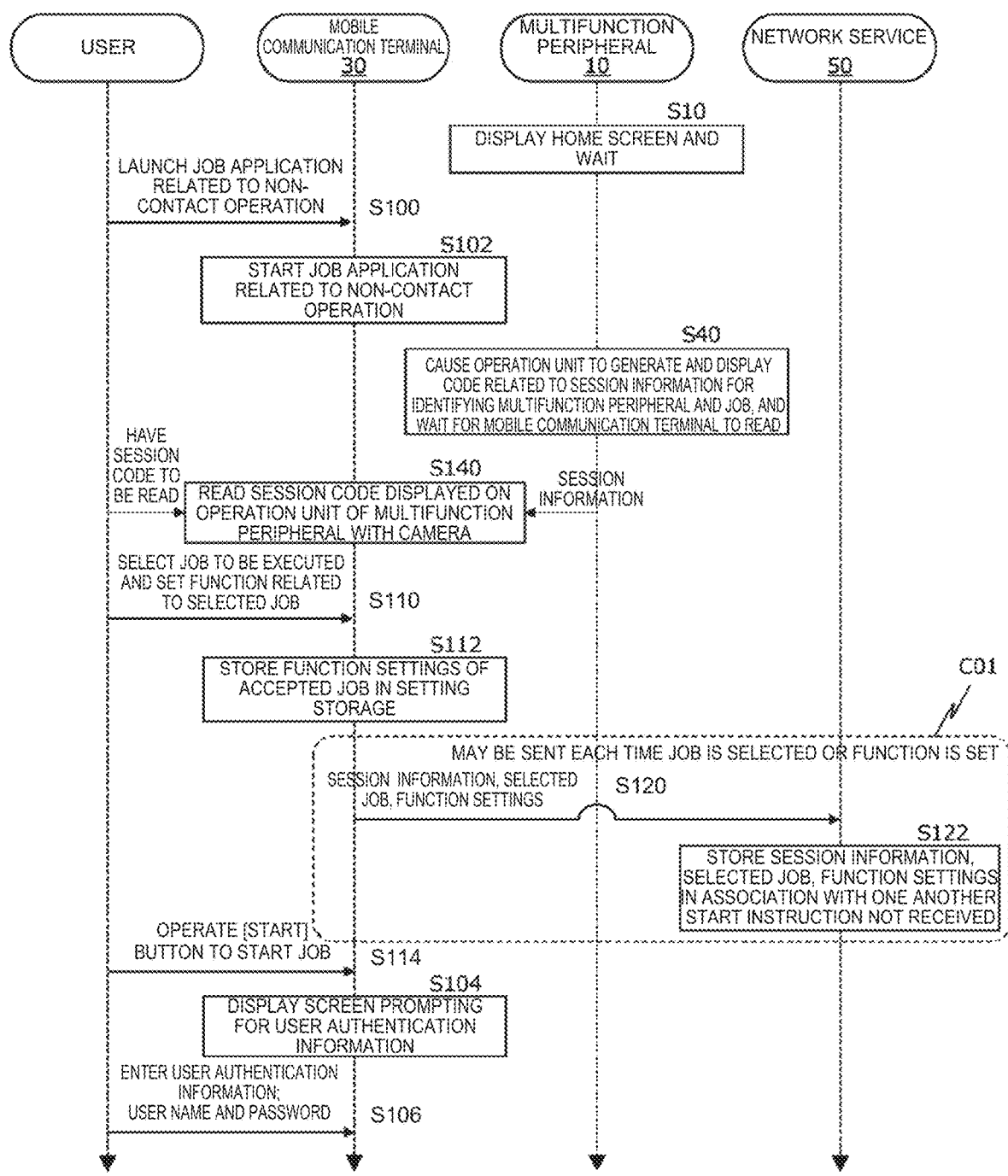
FIG. 13 is a first flowchart illustrating an example of processing according to a second embodiment.
Figure 14:
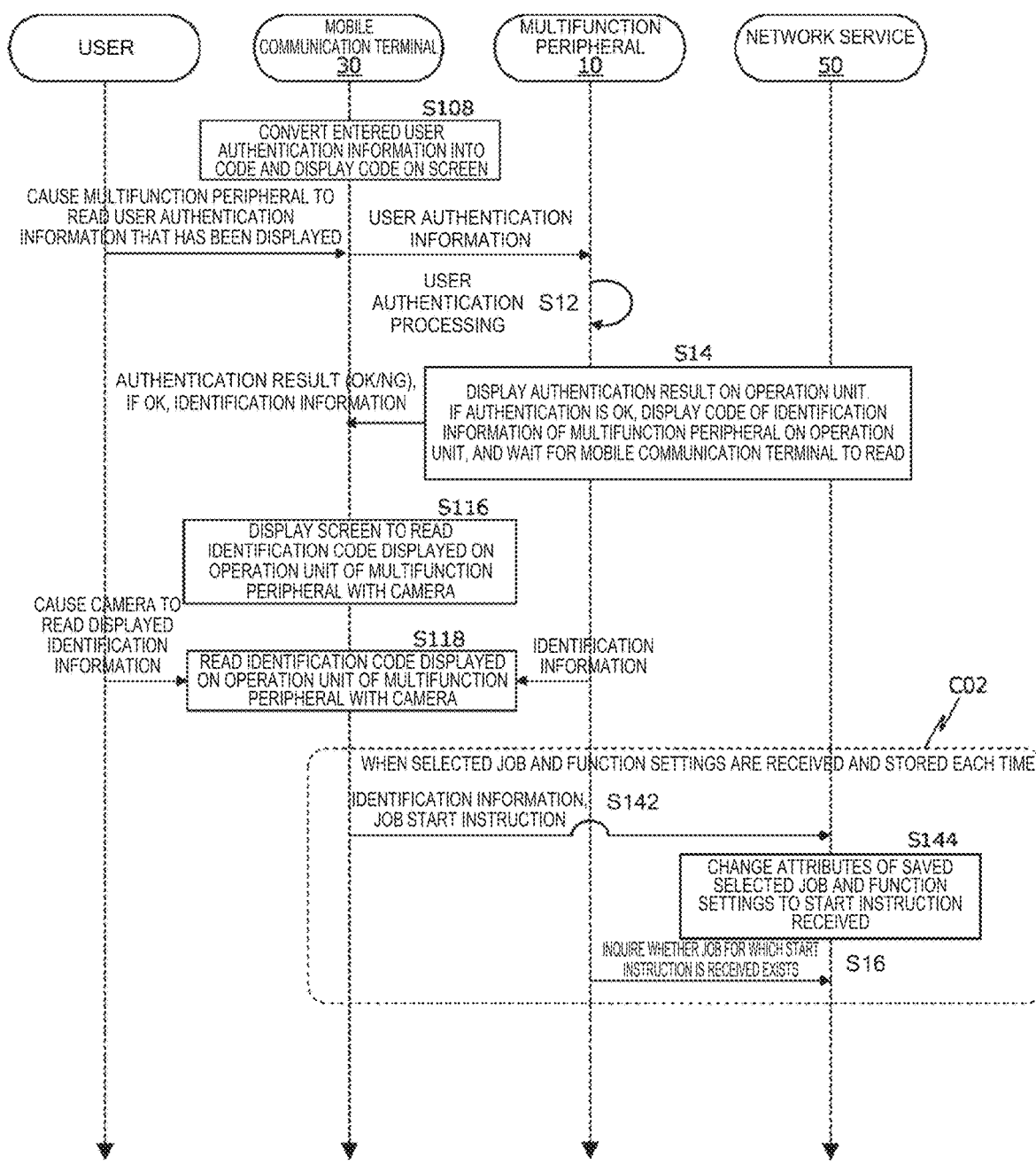
FIG. 14 is a second flowchart illustrating an example of processing according to the second embodiment.
Figure 15:
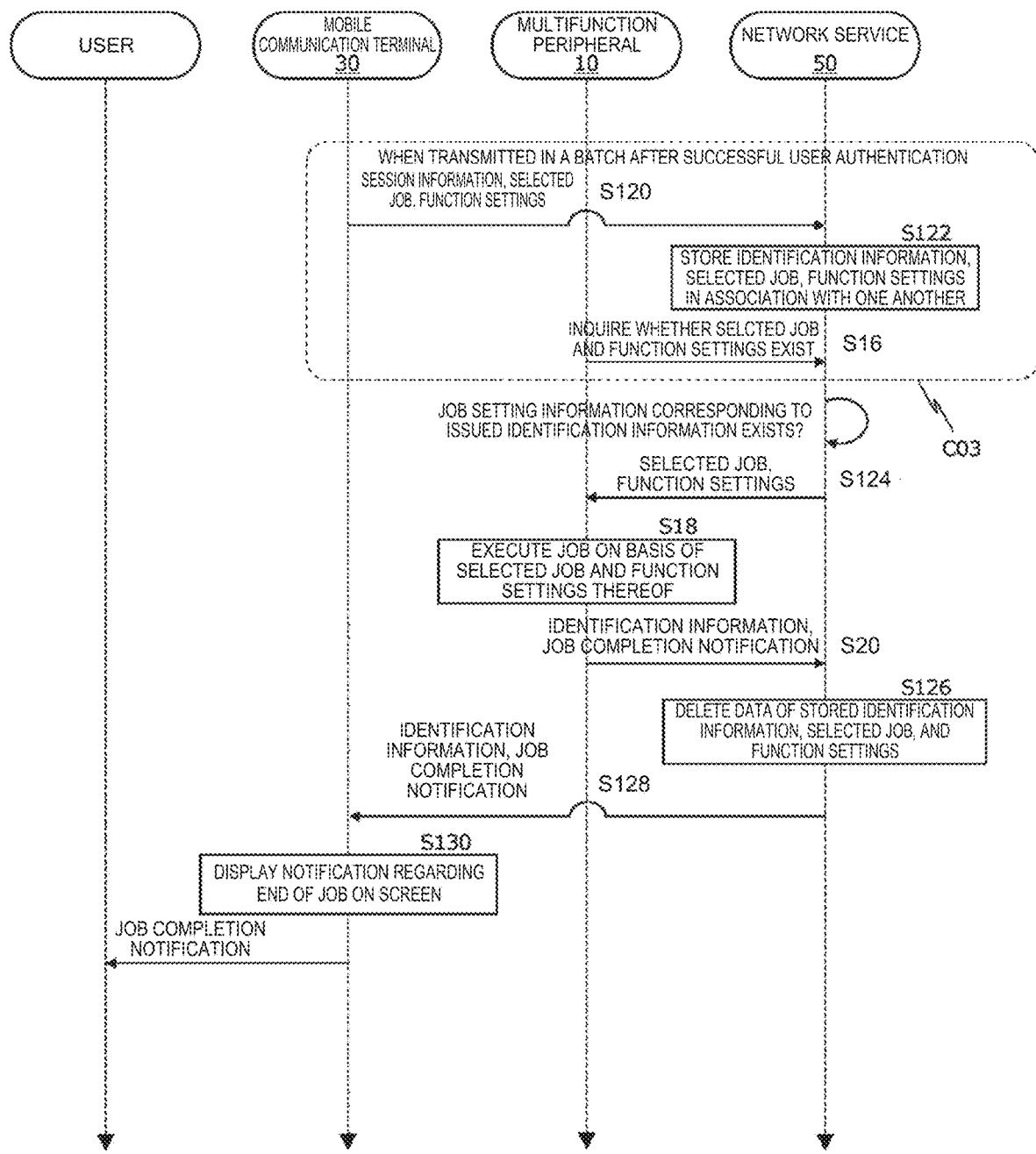
FIG. 15 is a third flowchart illustrating an example of processing according to the second embodiment.

FIGS. 13 to 15 are flowcharts illustrating the processing of each of the multifunction peripheral 10, mobile communication terminal 30, and network service 50 according to this embodiment. The same or similar processings as those in FIGS. 2 and 3 according to the first embodiment are designated by the same reference numerals as those in FIGS. 2 and 3. The processings that differ from those in FIGS. 2 and 3 are mainly described below.

When the tap operation of the remote operation button B6 is accepted on the home screen W2 of the multifunction peripheral 10 illustrated in FIG. 4, the controller 11, as the apparatus information generator 25, generates a code (session code) related to session information used to identify the multifunction peripheral 10 from other apparatuses and identify a job from other jobs. Then, the generated session code is then displayed on the operation unit 13 (step S40).

In the first embodiment and step S40 described above in this embodiment, when the tap operation of the remote operation button B6 is accepted on the home screen W2 of the multifunction peripheral 10, the controller 11 generates and displays the session code (see FIG. 5). Alternatively, when the power of the multifunction peripheral 10 is turned on or when the multifunction peripheral 10 restores from the energy saving mode, the controller 11 may generate a session code and then may display the non-contact operation acceptance screen W4 on the operation unit 13 as an alternative to the home screen W2. According to that mode, the user can initiate a non-contact operation without touching the operation unit 13 of the multifunction peripheral 10 at all. That is, the processing of step S40 illustrated in FIG. 13 can be made unnecessary.

Further, the controller 11 may also accept the setting of which screen including the home screen W2 and the non-contact operation acceptance screen W4 is to be displayed on the operation unit 13 in the initial state. The screen according to the setting may then be displayed on the operation unit 13.

The initial state may include the case when the [Reset] key (not illustrated) displayed on the screen of the operation unit 13 is operated or when the auto clear works after a predetermined period (60 seconds in one example) without any operation, in addition to turning on the power and restoring from the energy saving mode.

The user also launches the non-contact operation application (step S100). Once the non-contact operation application is started to run (step S102), the user causes the camera of the mobile communication terminal 30 to read the session code displayed on the operation unit 13. With this operation, the terminal controller 31 acquires the session information unique to the multifunction peripheral 10 that executes a job for which the operation instruction is to be accepted and the job (step S140). This session information is used at least until user authentication is performed. Although the session information may be used as the identification information of the multifunction peripheral 10 even after the user authentication, in the flowcharts illustrated in FIGS. 13 to 15, the identification information code of the multifunction peripheral 10 is separately acquired together with the user authentication result.

The terminal controller 31 accepts job selection and function settings using the non-contact operation application in the same manner as in the first embodiment. Each time a job is selected or a function is set, the terminal controller 31 may transmit information related to the selected job or function setting together with the session information to the network service 50 (step S120 illustrated within a chain line frame C01 in FIG. 13). In that case, the network service 50 that has received the selected job and the function settings associates these data, attaches a job ID for identifying and managing the job to the data, and stores the data in the memory. If a new function setting, or the like is received, the stored data is updated (step S122). Unlike the first embodiment, when the procedure indicated by the chain line frame C01 is configured to be executed, the data related to the selected job and the function settings managed by the network service 50 shall include the attribute of whether the job start instruction has been received.

Unlike the configuration indicated by the chain line frame C01, the processing procedure may be configured in such a that the terminal controller 31 collectively transmits the selected job and the function settings to the network service 50 after the user authentication described below.

When the settings related to the job are completed and the tap operation of the [Start] button B28 illustrated in FIG. 8A or the [Start] button B34 illustrated in FIG. 9A is accepted to start the job (step S114), the terminal controller 31 performs user authentication processing. That is, the terminal controller 31 causes the terminal display 33 to display a user authentication screen W20 prompting for the user name and password required to operate the multifunction peripheral 10 (step S104), and accepts the input of the user name and password (step S106). On the basis of the accepted input, the terminal controller 31 causes the terminal display 33 to display the authentication information code R20 (S108 illustrated in FIG. 14). When the user causes the multifunction peripheral 10 to read the authentication information code R20, the controller 11 of multifunction peripheral 10 performs user authentication in the same manner as in the first embodiment (step S12).

If the user authentication result is OK, the controller 11 causes the operation unit to display a screen corresponding to the non-contact operation acceptance screen W4 (see FIG. 5) of the first embodiment (step S14). However, in this embodiment, since the job selection and function setting have already been completed, there is no need to display (2) corresponding to the job selection and function setting, as an explanation of the operation procedure. Explanations corresponding to the document setting of (1) and the identification information code R2 of (3) may be displayed.

Similarly to the first embodiment, in addition to exchanging identification information using such a code, user authentication information may be directly exchanged without going through the Internet by using near field wireless communication or medium-range wireless communication.

When the user authentication is successful, the terminal controller 31 causes the terminal display 33 to display a screen for reading the identification information code R2 displayed on the operation unit 13 of the multifunction peripheral 10 (step S116). The user causes the camera of the mobile communication terminal 30 to read the identification information code R2, and the mobile communication terminal 30 thereby acquires the identification information of the multifunction peripheral 10 (step S118).

Here, as in the above-mentioned chain line frame C01, each time the job selection and the function setting are performed, the data is transmitted to the network service 50, and if the network service 50 stores the information, the processing indicated in a chain line frame C02 of FIG. 14 is performed at this point. That is, when the user causes the mobile communication terminal 30 to read the identification information code R2 displayed on the operation unit 13, the terminal controller 31 extracts identification information from the identification information code R2. Then, the aforementioned identification information and job start instruction are transmitted together with the session information to the network service 50 (step S142 indicated in the chain line frame C02).

The network service 50 that has received the identification information code and the job start instruction together with the session information from the multifunction peripheral 10 updates the attribute of the corresponding session information data, to the job start instruction received (step S144 indicated in the chain line frame C02).

The multifunction peripheral 10 performs HTTPS long polling to the network service 50 and inquires whether the data for which an instruction to start a job corresponding to the identification information of the multifunction peripheral 10 has been received exists (step S16 indicated in the chain line frame C02).

If the job setting information corresponding to the identification information of the multifunction peripheral 10 exists, the network service 50 establishes a connection with the multifunction peripheral 10 and transmits the job setting information stored in the memory to the multifunction peripheral 10 (step S124 illustrated in FIG. 15). Thereafter, the multifunction peripheral 10 executes a job in the same manner as in the first embodiment.

In contrast, the chain line frame C03 in FIG. 15 indicates the flow of processing corresponding to the case where the selected job and function settings are configured to be transmitted collectively from the mobile communication terminal 30 to the network service 50 after user authentication. Similarly to the first embodiment, the terminal controller 31 stores operations related to job selection and function setting accepted prior to the user authentication, in the setting storage 37.

When the user authentication is successful, the user causes the camera of the mobile communication terminal 30 to read the identification information code R2 displayed on the operation unit 13 of the multifunction peripheral 10 (step S116 illustrated in FIG. 14), and the mobile communication terminal 30 thereby acquires the identification information of the multifunction peripheral 10 (step S118).

When acquiring the identification information of the multifunction peripheral 10, the terminal controller 31 transmits the identification information and the selected job and the function settings stored in the setting storage 37 to the network service 50 (step S120 indicated in the chain line frame C03 of FIG. 15).

The network service 50 that has received the identification information, the selected job and the function settings from the multifunction peripheral 10 associates these data, attaches a job ID for identifying and managing the job to the data, and stores the data in a memory (step S122 indicated in the chain line frame C03).

The multifunction peripheral 10 performs HTTPS long polling to the network service 50 and inquires whether the job setting information corresponding to the identification information of the multifunction peripheral 10 exists (step S16 indicated in the chain line frame C03).

When the job setting information corresponding to the identification information of the multifunction peripheral 10 exists, the network service 50 establishes a connection with the multifunction peripheral 10 and transmits the job setting information stored in the memory to the multifunction peripheral 10 (step S124). Thereafter, the multifunction peripheral 10 executes a job in the same manner as in the first embodiment.

The above is the flow of processing in this embodiment.

Third Embodiment

In the first and second embodiments, the transmission of the user authentication information from the mobile communication terminal 30 to the multifunction peripheral 10 and the transmission of the identification information from the multifunction peripheral 10 to the mobile communication terminal 30 are performed with image information using a two-dimensional code. However, it has been mentioned that a direct exchange between the mobile communication terminal 30 and the multifunction peripheral 10 without going through the Internet may be performed by using near field wireless communication such as NFC or Bluetooth or medium-range wireless communication compliant with Direct Wi-Fi.

When using medium-range wireless communication, communication can be established even with a mobile communication terminal 30 that is not near the multifunction peripheral 10.

In this embodiment, it is assumed that the mobile communication terminal can detect its current position with the use of GPS or other functions. Further, it is assumed that the multifunction peripheral 10 is equipped with a position information provider 29 that provides the position where the own apparatus is installed.

Further, it is assumed that the exchange of user authentication information and identification information is performed via medium-range wireless communication.

The terminal controller 31 transmits information on the current position of the mobile communication terminal 30 to the multifunction peripheral 10 by medium-range wireless communication in addition to the user name and password entered at the time of user authentication.

The controller 11 of the multifunction peripheral 10 uses the current position information received from the mobile communication terminal 30 together with the authentication information to determine the authentication. Specifically, the controller 11 determines whether the current position of the mobile communication terminal 30 is within a predetermined range from the position of the own apparatus provided by the position information provider 29. If the current position is not within the predetermined range from the position of the own apparatus, the user authentication result is NG, even if the determination based on the received user name and password is OK. That is, user authentication cannot be passed unless the user performs the user authentication operation at a position within a predetermined range from the multifunction peripheral 10.

This configuration eliminates remote user authentication even if the user name and password are stolen and spoofing is performed. This will ensure a certain level of security.

As described above, (i) An image processing apparatus according to one aspect of the present disclosure includes an apparatus information generator that generates apparatus information including apparatus identification information, an authenticator that performs non-contact user authentication with a communication terminal by using communication without the Internet or by capturing image information, and a job controller that causes the communication terminal whose user has been authenticated by the authenticator to acquire the apparatus information by using communication without the Internet or by providing the apparatus information as image information, and that causes an apparatus corresponding to the apparatus information to execute a job on a basis of the apparatus information transmitted from the communication terminal via the Internet and setting information related to job execution.

In one aspect of the present disclosure, the communicator communicates via the Internet. The specific embodiment is achieved by, for example, a hardware resource of a communication circuit of a wired LAN or a wireless LAN, and a firmware (software resource) for communicating with the Internet via the communication circuit.

The mobile communication terminal is a device that has the function of communicating with an image processing apparatus via the Internet and the function of authenticating users through communication without the Internet or by the function of providing image information. The specific embodiments thereof include smartphones, tablet terminals, and PCs.

The authenticator performs non-contact user authentication with the user's mobile communication terminal. As a specific embodiment thereof, for example, a function implemented by executing control software in which a processor performs processing as the authenticator can be mentioned. The processor may be common to the non-contact operation acceptor.

Further, a job is a series of processing related to image processing executed by the image processing apparatus. The specific embodiments thereof include, for example, a scan job that performs a series of processing as a scanner, a print job that performs a series of processing as a printer, and a copy job that performs a series of processing as a copier. Other examples include document filing jobs and preview jobs. However, the type of jobs that can be performed by the image processing apparatus depends on the configuration of the apparatus.

Furthermore, the job controller controls the execution of jobs. The specific embodiment is achieved, for example, by executing control software in which a processor performs processing as the job controller.

Further, the non-contact operation acceptor performs the same processing as when the corresponding operation is performed by the operation unit of the image processing apparatus, on the basis of the operation instruction received from the mobile communication terminal. The image processing apparatus is an apparatus that performs processing related to images. For example, a single-function device such as a scanner, a printer, or a facsimile machine, or a multifunction peripheral having a plurality of functions thereof can be mentioned.

Further, a preferred embodiment of one aspect of the present disclosure will be described.

(ii) The authenticator may determine whether the communication terminal performing the communication is an authenticated terminal for which user authentication has been performed or an unauthenticated terminal for which user authentication has not been performed, and the job controller may accept the setting information related to the job execution from the authenticated terminal but not from the unauthenticated terminal.

In this way, by accepting operation instructions only from authenticated terminals, it is possible to prevent unauthenticated users from operating the image processing apparatus and executing jobs in the same way as when using the operation unit of the image processing apparatus, thus ensuring security through user authentication.

(iii) The authenticator may determine whether the communication terminal performing the communication is an authenticated terminal for which user authentication has been performed or an unauthenticated terminal for which user authentication has not been performed. The job controller may receive setting information related to the job execution from the communication terminal, and if the setting information is related to start of a job, the job controller may determine whether the communication terminal is the authenticated terminal or the unauthenticated terminal, and if the communication terminal is the unauthenticated terminal, the job controller may cause the authenticator to perform the user authentication to authenticate the user and then accept setting information related to start of the job, and if the setting information is not related to start of the job, the job controller may accept the setting information even if the communication terminal is the unauthenticated terminal.

In this way, operation instructions related to the start of a job can be accepted from the mobile communication terminal, and operation instructions related to the start of a job can be accepted only from a mobile communication terminal whose user has been authenticated. It is possible to prevent users of unauthenticated mobile communication terminals from executing jobs, thus ensuring security through user authentication. Meanwhile, by accepting operation instructions from an unauthenticated terminal if the operation instructions are not related to the start of a job, operations can be accepted without or before user authentication for the function settings of the image processing apparatus and settings related to a job. Thus, job selection and function settings by the non-contact operation application can be accepted in parallel at different mobile communication terminals of different users.

(iv) The authenticator may perform user authentication with the mobile communication terminal with a use of at least either near field wireless communication or medium-range wireless communication with position information as communication without the Internet.

In this way, it is possible to receive an operation instruction from the mobile communication terminal via the Internet and perform user authentication in a state where information security is taken into consideration by using near field wireless communication or medium-range wireless communication with position information without the Internet. By doing so, remote unauthorized operations can be blocked. Since recent mobile communication terminals generally have the functions of acquiring near field wireless communication, medium-range wireless communication, and position information in addition to the Internet communication, these functions can be used to perform non-contact user authentication and non-contact operation in an information security-conscious mode.

(v) The near field wireless communication may be communication by NFC, Bluetooth or Bluetooth LE.

Those near field wireless communications are provided by many mobile communication terminals. In this way, non-contact user authentication can be performed in an information security-conscious mode using near field wireless communication.

(vi) A position information provider that provides position information of an own apparatus may be further included. The medium-range wireless communication may be communication in a Direct Wi-Fi or Wi-Fi ad hoc mode. The authenticator may acquire a current position of the user's mobile communication terminal via the Internet or the medium-range wireless communication, and may authenticate the user when the mobile communication terminal is located within a predetermined range with respect to the position information of the own apparatus provided by the position information provider.

In this way, it is possible to acquire the position information of the user's mobile communication terminal obtained by a GPS (Global Positioning System) or the like, and perform user authentication only when the user is within a predetermined range from the position of the own apparatus. Therefore, even in the case of medium-range wireless communication which has a wider range of communication than near field wireless communication, it is possible to block remote unauthorized operations and perform non-contact user authentication in an information security-conscious mode.

(vii) The user authentication using the image information may perform reading of a two-dimensional code or a biometric image using a camera.

In this way, it is possible to block remote unauthorized operations, and implement user authentication in which information security is taken into consideration in a non-contact manner based on the information captured by the camera. The biometric image includes fingerprints, iris, and face images.

(viii) The job controller may receive the setting information from the mobile communication terminal via a server with which the user has registered an account.

In this way, the user logs into an account registered with the server in order to communicate through that server, and thus information security is further ensured by the authentication for the login to the server in addition to the user authentication of the image processing apparatus.

(ix) One aspect of the present disclosure includes an image processing method for a controller of an image processing apparatus. The image processing method includes generating apparatus information including apparatus identification information, performing non-contact user authentication with a communication terminal by using communication without the Internet or by capturing image information, causing the communication terminal whose user has been authenticated to acquire the apparatus information by using communication without the Internet or by providing the apparatus information as image information, and causing an apparatus corresponding to the apparatus information to execute a job on a basis of the apparatus information transmitted from the communication terminal via the Internet and setting information related to job execution.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image processing apparatus comprising:
an authenticator that performs user authentication;
an apparatus information generator that generates apparatus information including identification information to identify the image processing apparatus;
a display that displays a screen for displaying the apparatus information generated by the apparatus information generator; and
a job controller that receives setting information related to a function setting concerning a scan job to read an image on a document set on the image processing apparatus via a network from a communication terminal that reads the apparatus information displayed on the display, the job controller further executing the scan job based on the setting information that has been received,
wherein the setting information includes an e-mail address to which scan data, obtained by reading the image of the document, is sent,
the authenticator receives user authentication information from the communication terminal in a non-contact manner and performs the user authentication after a function selection screen is displayed, the function selection screen to receive a function selection from a plurality of functions, including a copy function, and
when the authenticator succeeds in the user authentication, the display displays the screen for displaying the apparatus information.

2. The image processing apparatus according to claim 1, wherein the authenticator receives the user authentication information by using communication without using Internet, or by capturing image information, and
wherein the communication without using the Internet comprises at least one of near field wireless communication or medium-range wireless communication using position information.

3. The image processing apparatus according to claim 2, wherein the near field wireless communication comprises communication through Near Field Communication (NFC), Bluetooth, or Bluetooth Low Energy (LE).

4. The image processing apparatus according to claim 2, further comprising a position information provider that provides position information of the image processing apparatus,
wherein the medium-range wireless communication comprises communication while in a Direct Wi-Fi mode or a Wi-Fi ad hoc mode, and
wherein the authenticator acquires a current position of the communication terminal of the user via the Internet or the medium-range wireless communication, and authenticates the user when the communication terminal is located within a predetermined range with respect to the position information of the image processing apparatus provided by the position information provider.

5. The image processing apparatus according to claim 2, wherein capturing the image information comprises reading a two-dimensional code or a biometric image using a camera.

6. The image processing apparatus according to claim 1, wherein the job controller receives the setting information from the communication terminal via a server with which the user has registered an account.

7. The image processing apparatus according to claim 1, wherein the screen for displaying the apparatus information includes an explanation showing an operation procedure to a user.

* * * * *